(12) United States Patent
Lin et al.

(10) Patent No.: US 11,724,387 B2
(45) Date of Patent: Aug. 15, 2023

(54) FAST ROBOT MOTION OPTIMIZATION WITH DISTANCE FIELD

(71) Applicant: FANUC CORPORATION, Yamanashi (JP)

(72) Inventors: Hsien-Chung Lin, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 335 days.

(21) Appl. No.: 16/839,642

(22) Filed: Apr. 3, 2020

(65) Prior Publication Data

US 2021/0308862 A1 Oct. 7, 2021

(51) Int. Cl.
*B25J 9/16* (2006.01)
(52) U.S. Cl.
CPC ........... *B25J 9/1605* (2013.01); *B25J 9/1651* (2013.01); *B25J 9/1666* (2013.01); *B25J 9/1697* (2013.01)
(58) Field of Classification Search
CPC ...... B25J 9/1605; B25J 9/1651; B25J 9/1666; B25J 9/1697; G05B 2219/35145
See application file for complete search history.

(56) References Cited

U.S. PATENT DOCUMENTS

| | | | |
|---|---|---|---|
| 5,150,026 A | * | 9/1992 | Seraji ..................... B25J 9/1643 318/567 |
| 5,347,459 A | | 9/1994 | Greenspan et al. |
| 6,678,582 B2 | | 1/2004 | Waled |
| 6,941,191 B2 | | 9/2005 | Jaeger |
| 8,315,738 B2 | | 11/2012 | Chang et al. |
| 8,386,080 B2 | | 2/2013 | Bosscher et al. |

(Continued)

OTHER PUBLICATIONS

The Convex Feasible Set Algorithm for Real Time Optimization in Motion Planning; Changliu Liu, Chung-Yen Lin, and Masayoshi Tomizuka; 23 pages; https://arxiv.org/pdf/1709.00627.pdf; Department of Mechanical Engineering, University of California at Berkeley, Berkeley, CA 94720, USA; SIAM Journal on Control and Optimization.

(Continued)

*Primary Examiner* — Bao Long T Nguyen
*Assistant Examiner* — Dylan M Katz
(74) *Attorney, Agent, or Firm* — John A. Miller; Shumaker, Loop & Kendrick

(57) ABSTRACT

A robot collision avoidance motion optimization technique using a distance field constraint function. CAD or sensor data depicting obstacles in a robot workspace are converted to voxels, and a three-dimensional binary matrix of voxel occupancy is created. A corresponding distance map matrix is then computed, where each cell in the distance map matrix contains a distance to a nearest occupied cell. The distance map matrix is used as a constraint function in a motion planning optimization problem, where the optimization problem is convexified and then iteratively solved to yield a robot motion profile which avoids the obstacles and minimizes an objective function such as distance traveled. The distance field optimization technique is quickly computed and has a computation time which is independent of the number of obstacles. The disclosed optimization technique is easy to set up, as it requires no creation of geometry primitives to approximate robot and obstacle shapes.

21 Claims, 8 Drawing Sheets

(56) References Cited

U.S. PATENT DOCUMENTS

| | | | |
|---|---|---|---|
| 9,144,904 B2 | 9/2015 | McGee et al. | |
| 9,643,316 B2 | 5/2017 | Krasny et al. | |
| 9,996,944 B2 | 6/2018 | Aghamohammadi et al. | |
| 9,999,975 B2 | 6/2018 | Frensch et al. | |
| 11,537,130 B2 * | 12/2022 | Gaschler | B25J 9/1682 |
| 2003/0108415 A1 * | 6/2003 | Hosek | B25J 9/1664 |
| | | | 414/783 |
| 2010/0298967 A1 * | 11/2010 | Frisken | G06F 30/17 |
| | | | 700/173 |
| 2015/0081200 A1 * | 3/2015 | Wang | B25J 9/1676 |
| | | | 701/301 |
| 2016/0016312 A1 * | 1/2016 | Lawrence, III | B23Q 17/2233 |
| | | | 700/98 |
| 2019/0240835 A1 | 8/2019 | Sorin et al. | |
| 2019/0369573 A1 * | 12/2019 | Quirynen | G05B 13/048 |
| 2020/0073399 A1 * | 3/2020 | Tateno | G05D 1/0274 |
| 2020/0189098 A1 * | 6/2020 | Kalakrishnan | B25J 9/1653 |
| 2020/0376663 A1 * | 12/2020 | Voelz | B25J 9/0084 |
| 2020/0398428 A1 * | 12/2020 | Murray | B25J 9/1682 |
| 2021/0053220 A1 * | 2/2021 | Ames | B25J 9/1651 |
| 2022/0281110 A1 * | 9/2022 | Vanheerden | B25J 19/06 |

OTHER PUBLICATIONS

Fast Robot Motion Planning with Collision Avoidance and Temporal Optimization; Hsien-Chung Lin, Changliu Liu, and Masayoshi Tomizuka; https://par.nsf.gov/servlets/purl/10101082; 2018; 7 pages; 2018 15th International Conference on Control, Automation, Robotics and Vision (ICARCV) IEEE.

* cited by examiner

FAST ROBOT MOTION OPTIMIZATION WITH DISTANCE FIELD

BACKGROUND

Field

The present disclosure relates to the field of industrial robot motion control and, more particularly, to a robot collision avoidance motion planning technique which converts obstacle data to voxels, creates a three-dimensional binary matrix of occupied and unoccupied voxels, and computes a distance map in which each cell contains a distance to a nearest occupied cell, then uses the distance map as a constraint in a motion optimization calculation to compute a most efficient robot arm path which avoids the obstacles.

Discussion of the Related Art

The use of industrial robots to perform a wide range of manufacturing, assembly and material movement operations is well known. In many robot workspace environments, obstacles are present and may be in the path of the robot's motion. The obstacles may be permanent structures such as machines and fixtures, or the obstacles may be temporary or mobile. A large workpiece which is being operated on by the robot may itself be an obstacle, as the robot must maneuver in or around the workpiece while performing an operation such as welding. Collisions between the robot and any obstacle must absolutely be avoided.

Prior art techniques for collision avoidance robot motion planning involve defining geometry primitives—such as spheres, cylinders, etc.—around each arm of the robot and around each obstacle. Geometry primitives are used in order to reduce the complexity of the collision avoidance motion optimization calculation to a manageable level. However, defining the geometry primitives around each obstacle and each robot arm is a tedious and time-consuming process. Furthermore, some objects, such as a vehicle body which is being welded or painted by the robot, do not lend themselves well to approximation using geometry primitives.

Another problem with prior art techniques for collision avoidance robot motion planning is that computation time for the optimization problem increases dramatically with the number of obstacles. If more than a few obstacles exist in the robot's workspace, the motion planning computation takes too long to be practical in an environment where collision avoidance calculations must be performed in real time as the robot operates.

In light of the circumstances described above, there is a need for an improved robot motion optimization technique which is easy to set up and which computes collision avoiding robot motion quickly regardless of the number of obstacles in the robot workspace.

SUMMARY

In accordance with the teachings of the present disclosure, a robot collision avoidance motion optimization technique using a distance field constraint function is disclosed. CAD or sensor data depicting obstacles in a robot workspace are converted to voxels, and a three-dimensional (3D) binary matrix of voxel occupancy is created. A corresponding 3D distance field matrix is then computed, where each cell in the distance field matrix contains a distance to a nearest cell occupied by an obstacle voxel. The distance field matrix is used as a constraint function in a motion planning optimization problem, where the optimization problem is convexified and then iteratively solved to yield a robot motion profile which avoids the obstacles and minimizes an objective function such as distance traveled. The distance field optimization technique is quickly computed and has a computation time which is independent of the number of obstacles. The disclosed optimization technique is easy to set up, as it requires no creation of geometry primitives to approximate robot and obstacle shapes.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a robot collision avoidance motion optimization technique using a distance field constraint function is merely exemplary in nature, and is in no way intended to limit the disclosed devices and techniques or their applications or uses.

It is well known to use industrial robots for a variety of manufacturing, assembly and material movement operations. In many robot workspace environments, obstacles are present and may be in the path of the robot's motion—that is, the obstacles may be located between where a robot is currently positioned and the robot's destination position. The obstacles may be permanent structures such as machines and fixtures, or the obstacles may be temporary or mobile. A large workpiece which is being operated on by the robot may itself be an obstacle, as the robot must maneuver in or around the workpiece while performing an operation such as welding. Techniques have been developed in the art for computing robot motions such that the tool follows a path which avoids collision of the robot with any defined obstacles.

Prior art techniques for collision avoidance robot motion planning involve defining geometry primitives—such as spheres, cylinders, etc.—around each arm of the robot and around each obstacle. Geometry primitives are used in order to reduce the complexity of the collision avoidance motion optimization calculation to a manageable level by approximating the real object geometries with simplified shapes.

Figure 1:
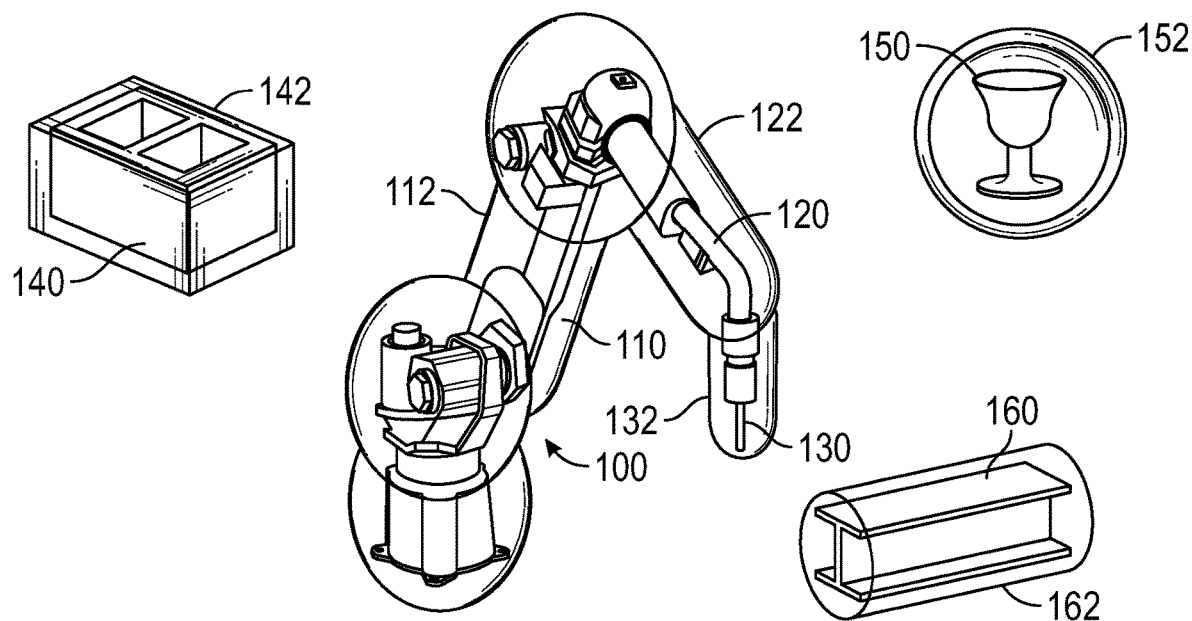
FIG. 1 is an illustration of an industrial robot working near obstacles, where the robot and the obstacles have corresponding geometry primitives defined and used for collision avoidance computations, as used in a technique known in the art.

FIG. 1 is an illustration of an industrial robot working near obstacles, where the robot and the obstacles have corresponding geometry primitives defined and used for collision avoidance computations, as used in a technique known in the art. A robot 100 is performing some programmed operation in a workspace—where the operation might be, for example, moving parts from a conveyor to a pallet or bin, or welding or spray painting a workpiece. The robot 100 is comprised of multiple articulated arms—including an inner arm 110, an outer arm 120 and a wrist/tool 130 among others. A number of obstacles exist in the workspace which the robot 100 must avoid. Obstacles 140, 150 and 160 are examples of different types of obstacles which may exist. In many cases, the obstacles 140, 150 and 160 are stationary; however, moving obstacles may also be present in the workspace, and can be accommodated in the techniques of the present disclosure discussed below.

As mentioned above, in order to simplify collision avoidance calculations, prior art techniques are known which define a safety zone geometry primitive around each robot arm and each obstacle. The robot inner arm 110 has a primitive 112, the outer arm 120 has a primitive 122, and wrist/tool 130 has a primitive 132, where the primitives 112, 122 and 132 are defined as cylinders with hemispherical ends. Other parts of the robot have a safety zone primitive defined as a sphere. The primitive 112 moves with the inner arm 110 in robot motion and collision avoidance calculations, and the same is true with the other primitives. Similarly, the obstacle 140 has a primitive 142 defined thereabout, the obstacle 150 has a primitive 152 and the obstacle 160 has a primitive 162.

Then, to calculate robot motions which avoid interference, distances are calculated from the robot arm primitives to the obstacle primitives, which is much simpler than calculating distances between actual detailed shaped of the arms and obstacles. However, defining the geometry primitives around each obstacle and each robot arm is a tedious and time-consuming process. In addition, because real robot arm parts and real obstacles typically have irregular shapes, the geometry primitives are often defined with significant empty space within the volume of the primitives. This causes the resulting robot motion program to move the robot further than is actually necessary to avoid a collision. Furthermore, some objects do not lend themselves well to approximation using geometry primitives.

Figure 2:
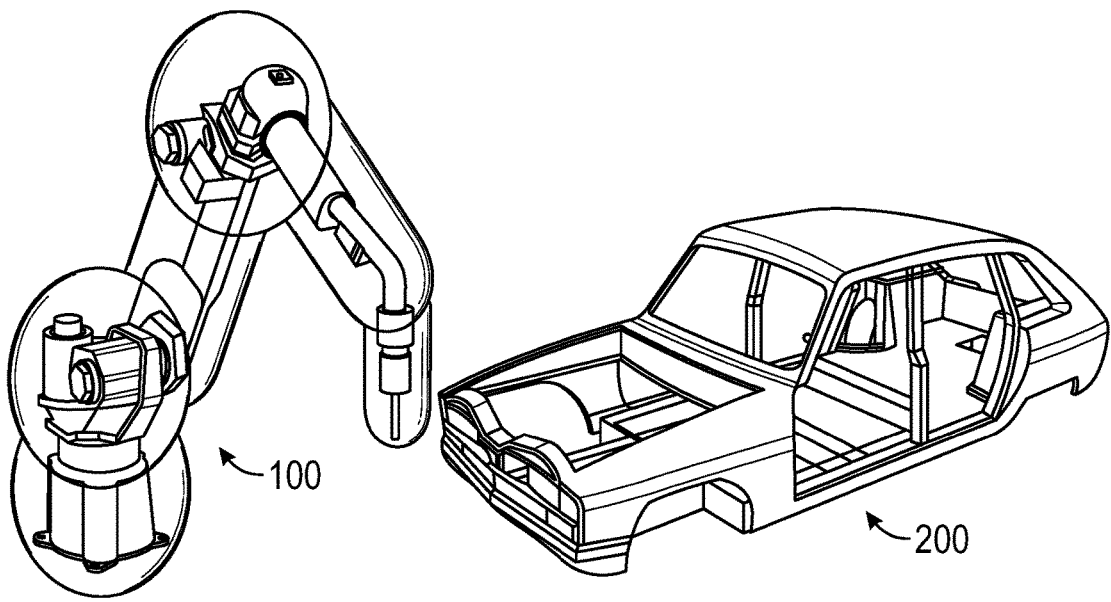
FIG. 2 is an illustration of an industrial robot working near a vehicle body, where the robot has corresponding geometry primitives as shown in FIG. 1 but the vehicle body is not readily modeled in terms of geometry primitives, as used in a technique known in the art.

FIG. 2 is an illustration of the industrial robot 100 working near a vehicle body 200, where the robot 100 has corresponding geometry primitives as shown in FIG. 1 but the vehicle body 200 is not readily modeled in terms of geometry primitives, as used in a technique known in the art. In the case illustrated in FIG. 2, it would be possible to define a hexahedron ("brick shape") geometry primitive around the vehicle body 200 to prevent collision by the robot 100, but the hexahedron would contain a large amount of free space around the vehicle body 200, where the free space would prevent the robot 100 from being able to weld or paint the vehicle body 200. Furthermore, the hexahedron would preclude motion of the robot 100 within cavities or openings in the vehicle body 200. The alternative would be to define a large number of geometry primitives approximating the shape of the vehicle body 200 (e.g., a cylinder primitive for the windshield "A" pillar, another cylinder primitive for the door "B" pillar, etc.), which would be a prohibitively tedious and time-consuming process.

Another problem with prior art techniques for collision avoidance robot motion planning is that, even when complex robot and obstacle shapes are approximated with geometry primitives, computation time for the motion optimization problem increases dramatically with the number of obstacles. If more than a few obstacles exist in the robot's workspace, the motion planning computation takes too long to be practical in a real-time environment where motion planning calculations must be made continuously and quickly.

To overcome the problems described above, a new robot collision avoidance motion optimization technique using a distance field constraint function is disclosed herein. The collision avoidance motion optimization technique of the present disclosure offers easy setup, using computer aided design (CAD) data or sensor data to define obstacles, and avoiding the need for manual definition of geometry primitives around robot arms and obstacles. The disclosed technique also provides fast optimization computation, and the computation time does not increase with increasing numbers of obstacles.

Figure 3:
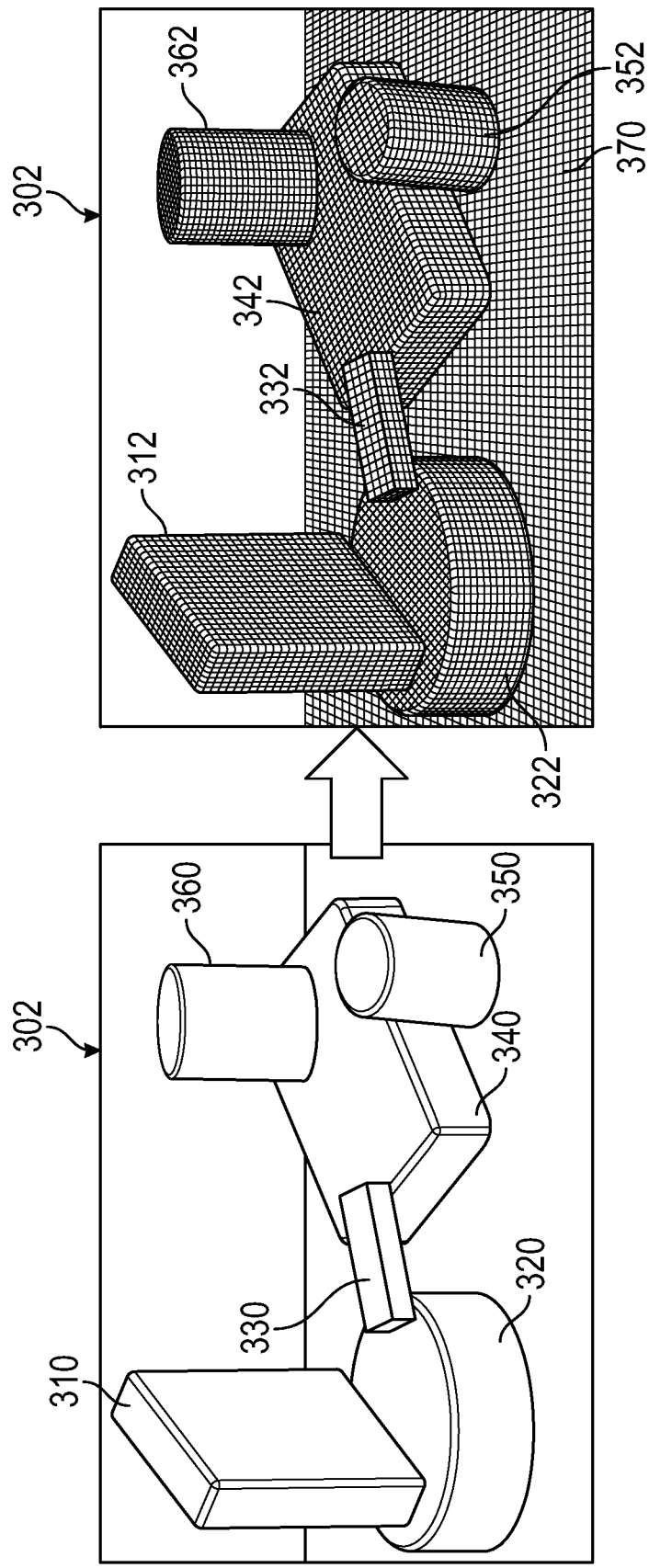
FIG. 3A is an illustration of obstacles in a robot workspace defined as CAD data, according to an embodiment of the present disclosure.
FIG. 3B is an illustration of the obstacles of FIG. 3A converted to volume elements (voxels), according to an embodiment of the present disclosure.

FIG. 3A is an illustration of obstacles in a robot workspace 302 defined as CAD data, according to an embodiment of the present disclosure. Using the techniques of the present disclosure, obstacles in the robot workspace 302 can be defined by CAD data or by data from object sensors. In the example of FIG. 3A, CAD data is used to describe the obstacles. CAD data may be a preferable option for defining obstacles when the layout of the workspace 302, including the obstacles, is known in advance, during the design phase of the robot's operation (such as welding or painting). If obstacle CAD data is not available, or if moving obstacles are possible in the workspace 302, then data from object sensors may be used to define the obstacles.

In FIG. 3A, obstacles 310, 320, 330, 340, 350 and 360 exist, each having different sizes and shapes. The obstacles 310-360 can be any type of real part, fixture or other object, and the obstacles 310-360 are not surrounded with or modeled as geometry primitives in the disclosed techniques. Most of the obstacles 310-360 are shown as simple geometric shapes, but this is merely for simplicity and clarity of illustration. The obstacles 310-360 of FIG. 3A, being defined by CAD data, have smooth and well-defined surfaces. If the obstacles 310-360 were defined by object sensor data, they would include the irregularities and approximations typical of object sensor data. Object sensors used to determine the obstacles 310-360 could include one or more of digital cameras, radar sensors, LiDAR sensors, ultrasonic sensors and/or infrared sensors.

FIG. 3B is an illustration of the obstacles of FIG. 3A converted to volume elements (voxels), according to an embodiment of the present disclosure. FIG. 3B illustrates the same workspace 302 as FIG. 3A, with the only difference being the voxelization of the obstacles in FIG. 3B. A voxel represents a cell in a regular grid in three-dimensional space, as known in the art. Voxels are particularly useful at representing regularly sampled spaces that are non-homogeneously filled—such as the workspace 302 which is mostly open space, but has solid obstacles in some places. The obstacles 310-360 have been divided into polyhedrons, such as hexahedrons or more specifically cubes, where each polyhedron is one voxel. The obstacles 310-360 are represented as voxel sets 312-362, respectively. That is, a voxel set 312 represents the obstacle 310, a voxel set 362 represents the obstacle 360, and so forth. A voxel representation of a floor 370 is also provided. Converting data from macroscopic objects (from CAD or sensor data) to discrete voxels is a process known in the art. This process is used as a preparatory step in the techniques of the present disclosure.

Figure 4:
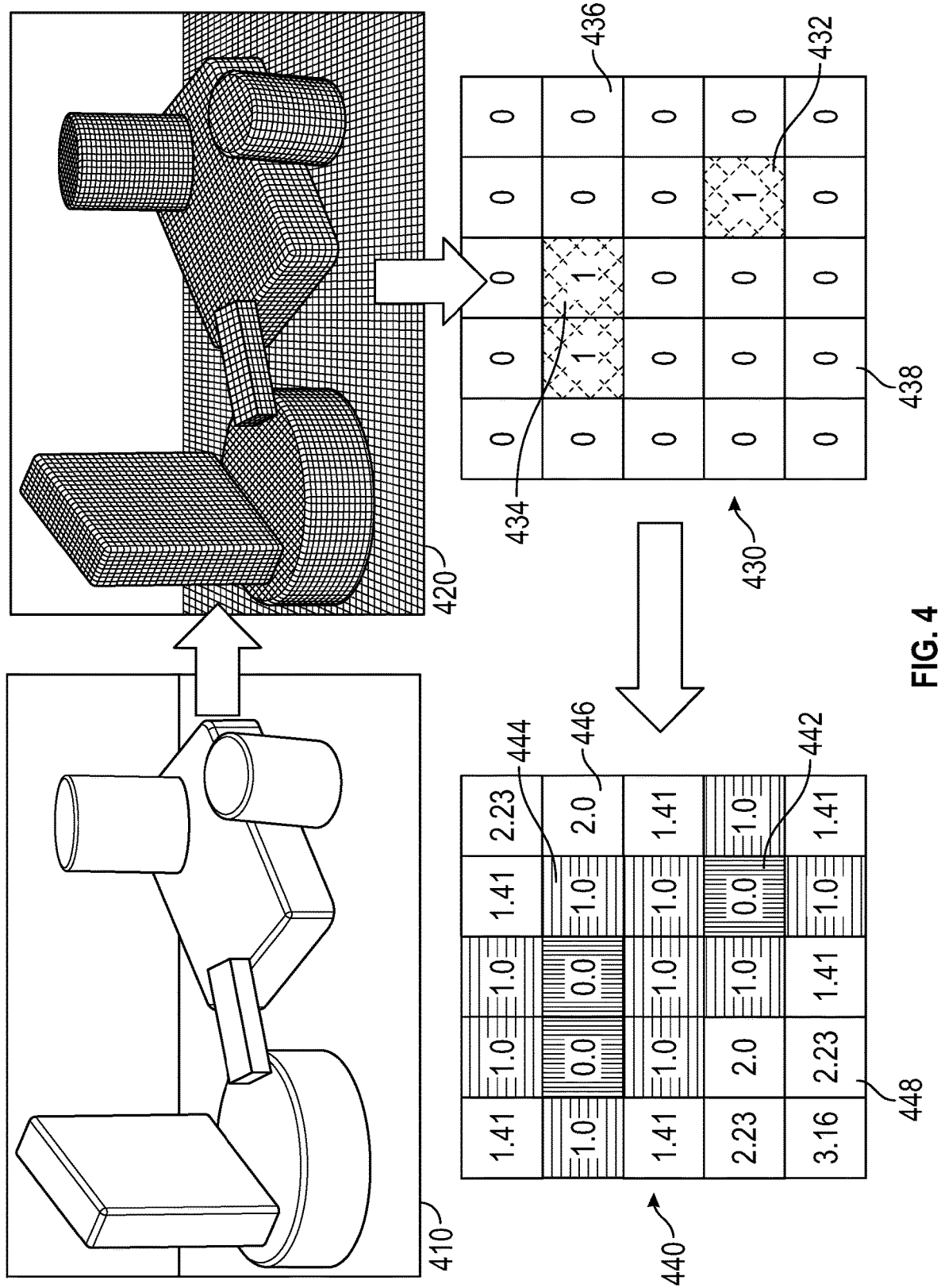
FIG. 4 is a block diagram illustrating data flow for converting obstacle CAD or sensor data to voxels and then to a binary matrix of voxel occupancy, and finally to a distance field matrix, according to an embodiment of the present disclosure.

FIG. 4 is a block diagram illustrating data flow for converting obstacle CAD or sensor data to voxels and then to a binary matrix of voxel occupancy, and finally to a distance map matrix, according to an embodiment of the present disclosure. Block 410 where CAD or sensor data defining obstacles is provided, and block 420 where the obstacles are voxelized, were discussed earlier in reference to FIGS. 3A and 3B. A three-dimensional binary matrix 430 is then created from the voxels of the block 420. The binary matrix 430 is a three-dimensional (3D) matrix representing the workspace 302, where each cell in the matrix 430 has a binary value of either zero or one. A cell in the matrix 430 has a value of zero if the cell is not occupied by any of the voxels of FIG. 3B. If any of the voxels of FIG. 3B occupies part or all of a cell in the matrix 430, then that cell has a value of one.

The matrix 430 is shown in FIG. 4 as a two-dimensional grid for ease of visualization, but the matrix 430 is actually three-dimensional and represents the volume of the workspace 302. For example, the 5×5 grid shown in FIG. 4 could be the bottom layer of the matrix 430. A cell 432 has a value of one, thus representing a voxel which is occupied by part of one of the obstacles 310-360. A cell 434 also has a value of one. A cell 436 has a value of zero, thus representing a voxel which is not occupied by part of any of the obstacles 310-360. A cell 438 also has a value of zero. Referring again to the voxelized obstacle data of the block 420, all of the voxels which make up the obstacles 310-360 would have a value of one in the matrix 430, and all of the air or free space (not occupied by the obstacles 310-360) would have a value of zero in the matrix 430. The floor 370 could be represented as a layer of ones (occupied) in the matrix 430, or the matrix 430 could be defined so that the floor 370 is beneath the matrix 430 and therefore not included in the matrix 430.

The binary matrix 430 can have any size and dimensions suitable for the purposes of the disclosed robot motion optimization. In one example discussed further below, the workspace 302 has a size of 1.5 meters by 1.5 meters (floorspace), by 1.0 meters high. This 1.5×1.5×1.0 meter volume may be divided into the binary matrix 430 having dimensions of 300×300×200 cells, where each cell is a cube having 5×5 mm sides. These dimensions are merely exemplary, but represent an example which corresponds to a real robot workspace and which can be rapidly computed using readily available processor hardware.

As discussed above, the binary matrix 430 is a 3D matrix of ones and zeroes representing the workspace 302, where the ones are the cells of the matrix 430 which are occupied by the obstacles 310-360. The next step in the process is to compute a distance map or distance field matrix 440. The distance field matrix 440 is a 3D matrix having the same size and dimensions as the binary matrix 430. The distance field matrix 440 is also shown in FIG. 4 as a two-dimensional grid for ease of visualization.

Each cell in the distance field matrix 440 is populated with a value representing the distance from that particular cell to the nearest occupied cell. For example, consider the free space cell 436 of the binary matrix 430. The nearest occupied cell is the cell 434, which is two cell units to the left. Thus, the value of a cell 446 in the distance field matrix 440 is 2.0, meaning that the nearest occupied cell is 2.0 units away. Consider the free space cell 438 of the binary matrix 430. The nearest occupied cell is the cell 432, which is two cell units to the right and one unit up. Thus, the value of a cell 448 in the distance field matrix 440 is 2.23 (square root of 5, which is the hypotenuse length of a triangle with sides of 2 and 1), meaning that the nearest occupied cell is 2.23 cell units away. This distance field value example is computed in two dimensions (the square root of the sum of the squares of the distances in two directions) to match the two-dimensional grid illustration of FIG. 4. In actual practice, where the distance field matrix 440 is a 3D matrix, the distance value is computed in three dimensions (the square root of the sum of the squares of the distances in three directions). If the distance field map 440 contains values which represent a number of cells, then the true distance can be obtained by multiplying by the cell size. For example, if a cell in the distance field map 440 has a value of 10.0 cells to the nearest occupied cell, and the cell size is 5 mm, then the actual distance to the nearest obstacle is 50.0 mm. Alternately, the cells in the distance field map 440 could be populated with actual distance values rather than a number of cell units.

A cell 442 in the distance field matrix 440 has a distance value of 0.0, because it corresponds to the occupied cell 432. A cell 444 in the distance field matrix 440 has a distance value of 1.0, because it is right next to (one cell distant from) the occupied cell 434. Recognizing that the distance field matrix 440 is three-dimensional, it can be understood that some cells in the distance field matrix 440 will themselves be occupied and be surrounded by occupied cells. For cells such as these, which are "inside" one of the obstacles 310-360, the distance field is given a negative value and represents the distance to the nearest unoccupied cell, which is calculated in the same three dimensional manner discussed previously (the square root of the sum of the squares of the distances in three directions).

Figure 5:
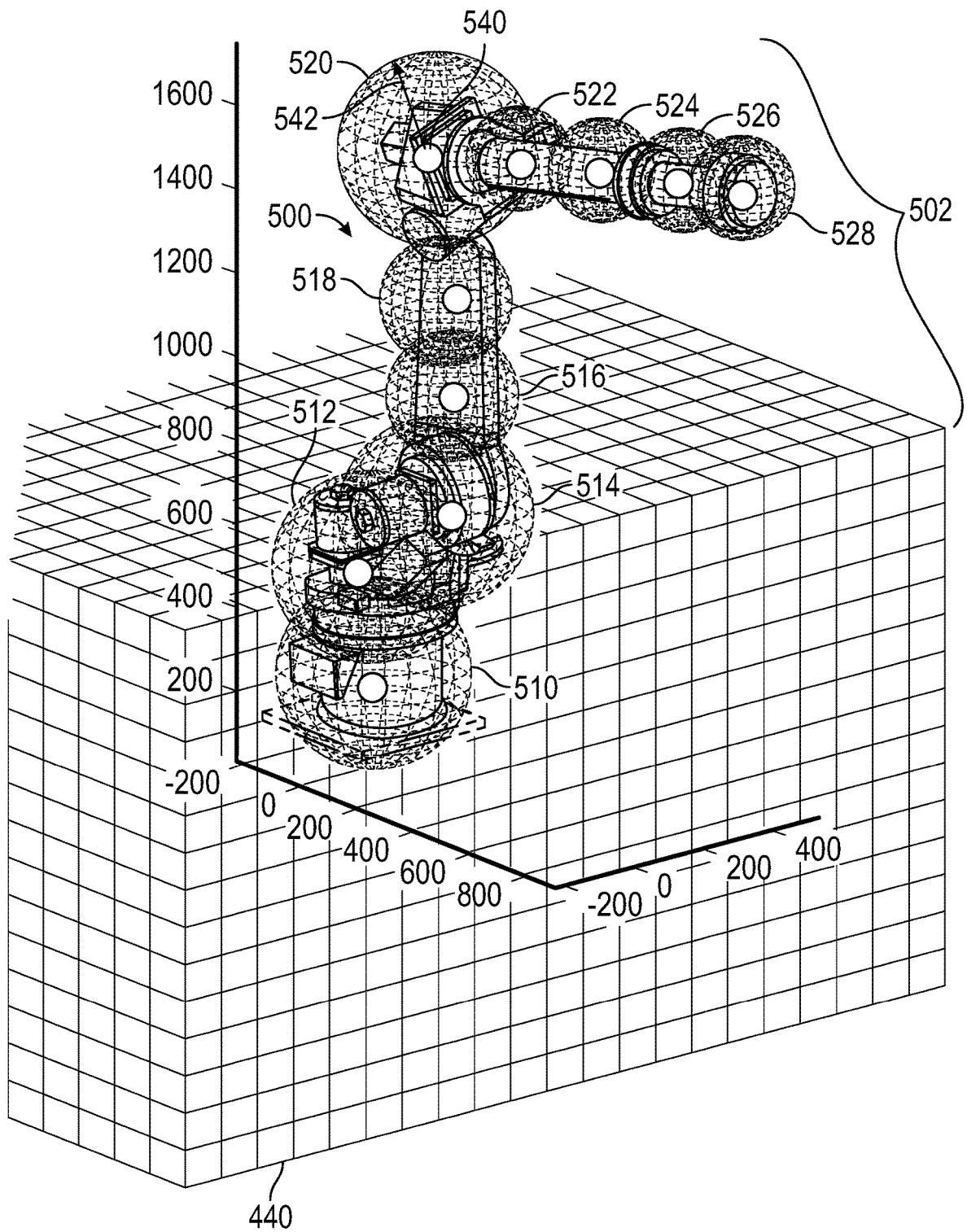
FIG. 5 is an illustration of a robot operating in a workspace which is represented by the distance field matrix of FIG. 4, according to an embodiment of the present disclosure.

FIG. 5 is an illustration of a robot 500 operating in a workspace 502 which is represented by the distance field matrix 440 of FIG. 4, according to an embodiment of the present disclosure. The robot 500 is a multi-arm articulated robot, and each arm has one or more spherical safety zone bubbles defined around it. A bubble 510 is defined around the robot base, a bubble 512 is defined around the hip joint, bubbles 514-518 surround the inner arm, a bubble 520 surrounds the elbow joint, and bubbles 522-528 surround the outer arm and wrist/tool. The safety zone bubbles 510-528 define spatial volumes which envelope the arms of the robot 500, and will be used in the collision avoidance calculations discussed below. Each of the bubbles has a known center point and radius. For example, the bubble 520 has a center point 540 and a radius 542.

It is to be understood that the obstacles 310-360 shown in FIG. 3A exist in the workspace 502 of FIG. 5. The distance field map 440, computed based on the obstacles 310-360, is overlaid on the workspace 502 such that the robot 500 performs its work in the spatial volume of the distance field map 440. As the robot 500 articulates through its range of motion, each of the center points of the bubbles 510-528 may occupy one of the cells of the distance field matrix 440. At any particular pose of the robot 500, a distance can be computed from each bubble to the nearest occupied cell of the distance field map 440 as:

$$\text{Dist}(p_i, r_i, DF) = DF(x_i, y_i, z_i) - r_i \quad (1)$$

Where $p_i$ is a center point of a particular one (i) of the bubbles 510-528, $r_i$ is the radius of the bubble having the center point $p_i$, DF is the value of the distance field map 440 for the cell at coordinates $(x_i, y_i, z_i)$, which is the location of the center point $p_1$.

In other words, when the center point 540 of the bubble 520, for example, is at a location $(x_i, y_i, z_i)$ (in some fixed workspace coordinate frame), then the minimum distance from the bubble 520 to any of the obstacles 310-360 is the value of the cell in the distance field map 440 currently occupied by the center point 540, minus the radius of the bubble 520. This calculation is performed for the center point and radius of each of the bubbles 510-528 at each pose of the robot 500 which is evaluated during a motion optimization computation. Because the distance field map 440 is pre-computed for a particular obstacle field, Equation (1) is a very simple subtraction problem which is easily solved for each of the ten bubbles 510-528.

Then, for the particular pose of the robot 500, the minimum distance from the robot 500 to any of the obstacles 310-360, Dist(Robot,Obs), is the minimum of the values computed from Equation (1) for each of the ten bubbles (i). That is:

$$\text{Dist}(Robot, Obs) = \min_i \text{Dist}(p_i, r_i, DF) \quad (2)$$

For example, in a pose where the robot 500 is reaching down toward the obstacles 310-360, the bubble 528 may have the minimum distance to an obstacle by virtue of its center point occupying a cell in the distance field map 440 with a very low value.

If a pose of the robot 500 is evaluated where one or more of the center points is actually within (interfering with) an obstacle, then the minimum distance will be computed as a negative value for that pose. Because the minimum distance value is used as a constraint function which must be greater than some threshold safety value in the motion optimization computation (discussed below), poses with interference will be penalized and will cause the motion optimization calculation to find a different solution without interference.

Figure 6A:
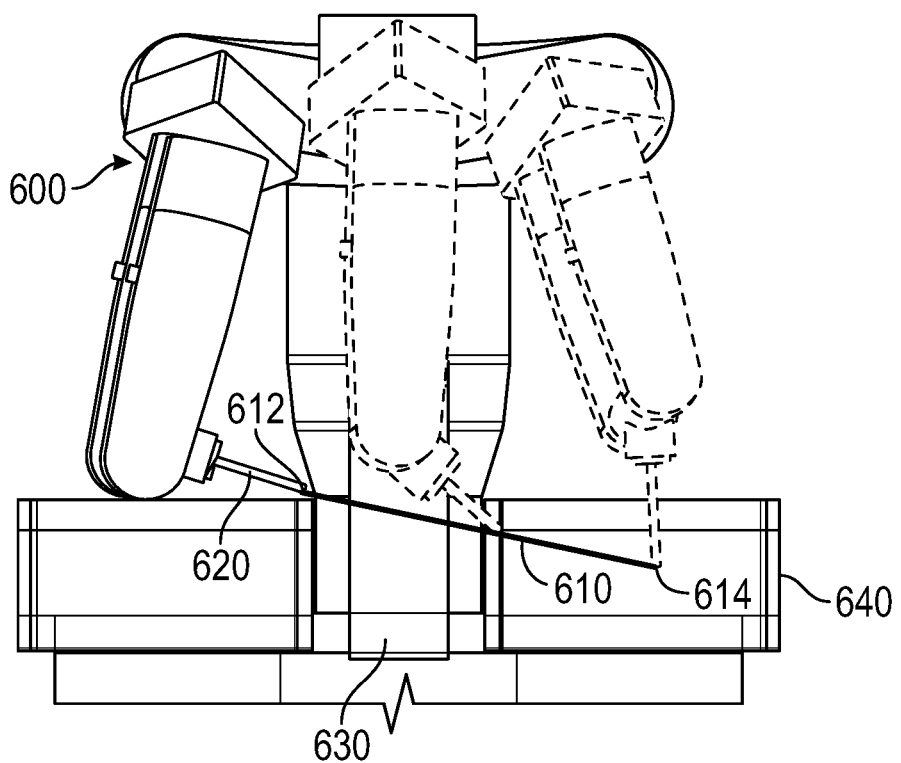
FIG. 6A is a multi-step illustration of a robot following a path defined without collision avoidance constraints included in motion planning, with resulting obstacle collisions.

FIG. 6A is a multi-step illustration of a robot 600 following a path 610 defined without collision avoidance constraints considered in motion planning. The path 610 is defined as proceeding from a start position 612 ($q_{start}$) to a goal position 614 ($q_{goal}$) The start position 612 might be a location where a tool 620 of the robot 600 picks up a part from a first bin, and the goal position 614 might be a location where the robot 600 places the part in a second bin, for example. In FIG. 6A, the robot 600 is shown in three poses;

where the tool 620 is located at the start position 612, an intermediate position, and the goal position 614.

Many factors can be considered in motion optimization calculations used to compute a path such as the path 610. The start and goal positions (612, 614) must of course be met, so these are defined as equality constraints. Another equality constraint may be defined which includes system dynamics or kinematics equations, which ensure that the computed motions can actually be physically performed by the robot. Inequality constraints may be defined to prevent joint rotational velocities and accelerations, and tool center point Cartesian acceleration and jerk, from exceeding threshold values. Also, an optimization objective function must be defined—and may be used to optimize the efficiency of the path by minimizing a parameter such as distance travelled, path curvature, travel time, or energy consumed by the robot, for example.

If collision avoidance is not defined as a constraint function, the motion optimization will likely cause the robot 600 to follow a path similar to the path 610, where the tool 620 of the robot 600 crashes into an obstacle such as a wall 630 or a bin 640. Collisions with any such obstacle are obviously not acceptable, so collision avoidance conditions must be added as a constraint function. In the techniques of the present disclosure, the collision avoidance constraint function is defined in terms of the distance field map 440 using the calculations of Equations (1) and (2).

Figure 6B:
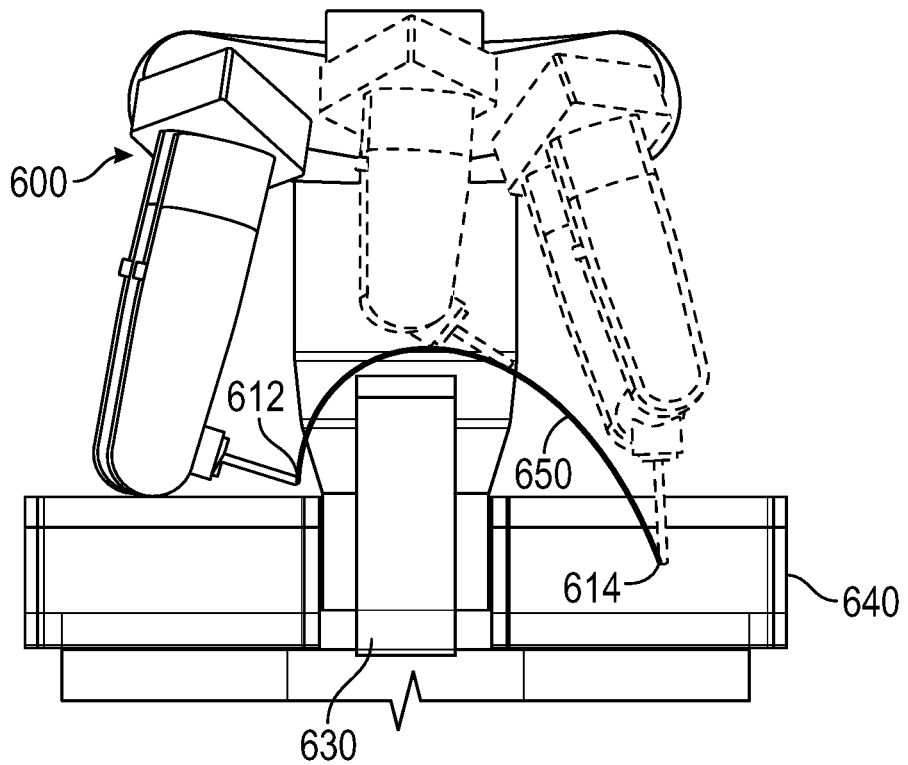
FIG. 6B is a multi-step illustration of a robot following a path defined with collision avoidance motion planning, according to an embodiment of the present disclosure.

FIG. 6B is a multi-step illustration of a robot following a path defined with collision avoidance motion planning according to an embodiment of the present disclosure. In FIG. 6B, a path 650 is calculated for the tool 620 of the robot 600. The path 650 uses the same start position 612 and the same goal position 614 as the path 610. However, in calculating the path 650, a collision avoidance constraint function is used in the motion optimization.

Specifically, a collision avoidance inequality constraint function is used in the motion optimization calculation, where the collision avoidance constraint is defined so that the minimum distance from the robot 600 (represented by safety zone bubbles as discussed above) to any of the obstacles (the wall 630 and the bin 640), determined from a distance field map of the wall 630 and the bin 640 using Equations (1) and (2), must be greater than some threshold safety value (such as 50 mm, for example). When the motion optimization calculation includes this collision avoidance inequality constraint, along with the other constraint functions and the objective function discussed earlier with respect to FIG. 6A, the path 650 is the result. It can be seen in FIG. 6B that the path 650 causes the tool 620 and all parts of the robot 600 to avoid the wall 630 and the bin 640.

Figure 7:
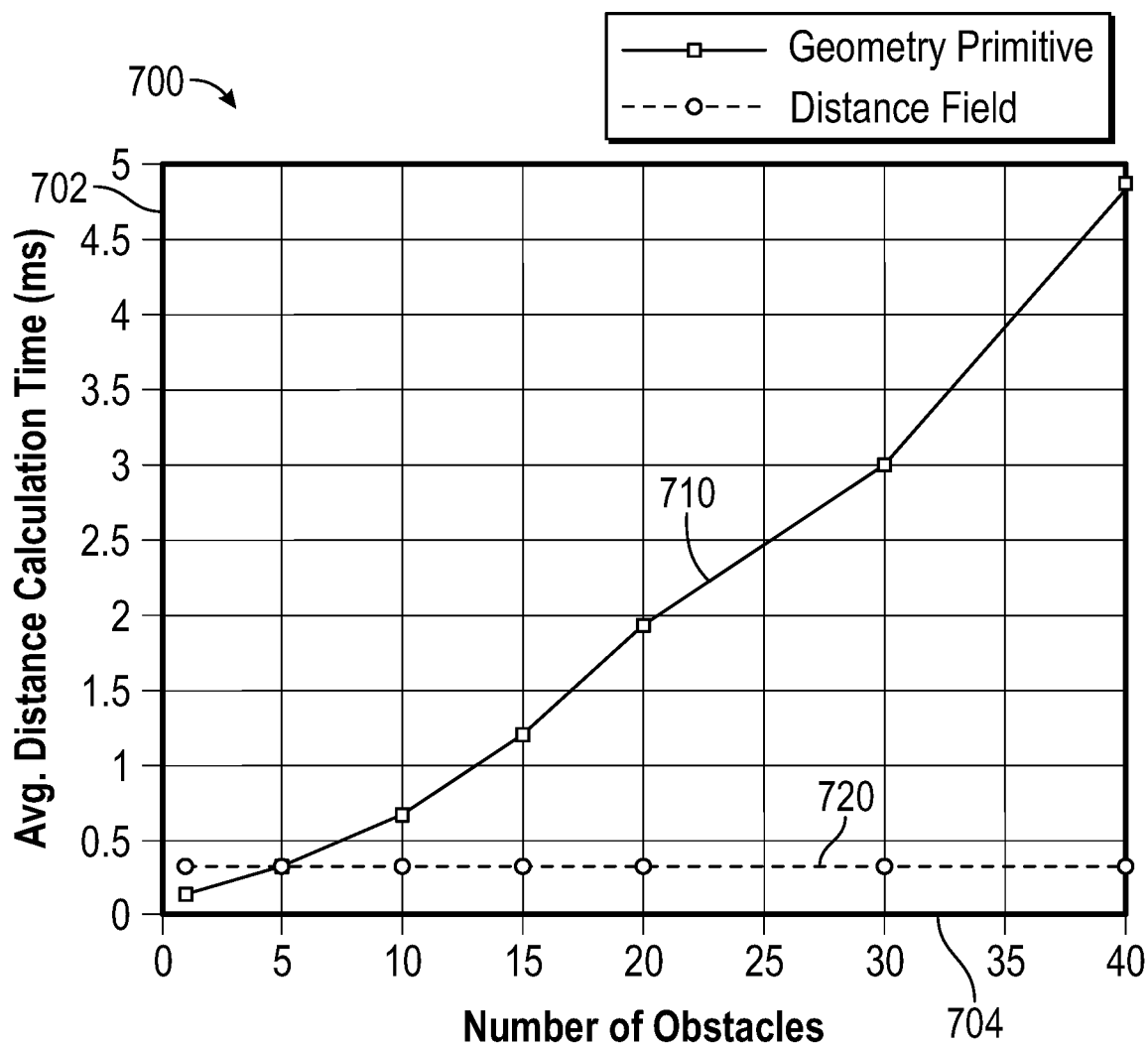
FIG. 7 is a graph of distance calculation time versus number of obstacles, for conventional distance calculation techniques using geometry primitives, and for distance calculation using a distance field matrix according to an embodiment of the present disclosure.

FIG. 7 is a graph 700 of distance calculation time versus number of obstacles, for conventional distance calculation techniques using geometry primitives, and for distance calculation using a distance field matrix according to an embodiment of the present disclosure. The graph 700 includes a curve 710 and a curve 720, each plotting distance calculation time on a vertical axis 702 versus number of obstacles on a horizontal axis 704. The curve 710 shows that with conventional distance calculation techniques, where obstacles and robot arms are represented by geometry primitives, the calculation time increases dramatically with the number of obstacles. In contrast, the curve 720 shows that with the distance calculation techniques of the present disclosure, where obstacles are represented by a distance field map and robot arms are represented by a number of points and spherical bubbles, the calculation time is low and is independent of the number of obstacles.

It can easily be appreciated that the rapid distance calculations using the distance field map technique are especially advantageous when motion optimization calculations must take place in real time during robot operations. Consider for example an application where parts on an inbound conveyor must be picked by the robot and placed in a next available spot in a shipping container. In this example application, both the start position ($q_{start}$) and the goal position ($q_{goal}$) are unique for each pick and place operation, which means that a new path must be computed using motion optimization. When the robot-to-obstacle distance calculation (for the collision avoidance constraint function) is performed using the distance field map technique, the iterative optimization calculation can be completed rapidly enough to support real-time robot operations.

Figure 8:
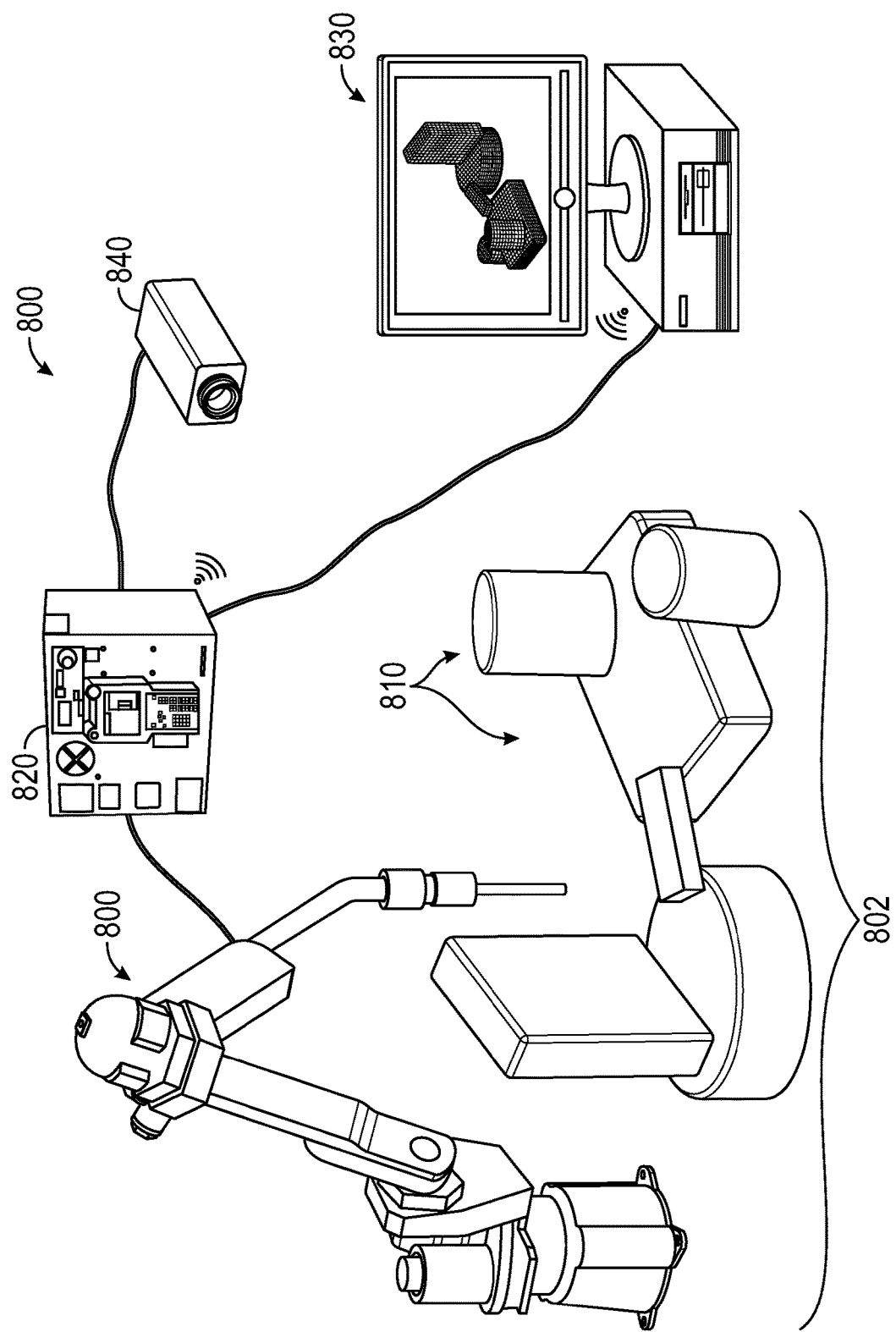
FIG. 8 is an illustration of a system for robot collision avoidance motion optimization using a distance field constraint function, according to embodiments of the present disclosure.

FIG. 8 is an illustration of a system for robot collision avoidance motion optimization using a distance field constraint function, according to embodiments of the present disclosure. A robot 800 operates in a workspace 802 including one or more obstacles 810. The obstacles 810 are illustrated as the obstacles 310-360 of FIG. 3A simply for consistency. A controller 820 communicates with the robot 800, typically via a hardwire cable connection. The controller 820 controls the motion of the robot 800 by sending joint motor commands to the robot 800 and receiving joint motor position data from joint encoders in the robot 800, as known in the art.

A computer 830, in communication with the controller 820, may be used for several different tasks—including providing obstacle geometry data in the form of CAD solid or surface models. The computer 830, if used, communicates with the controller 820 via any suitable wireless or hardwire network connection. As an alternative to using CAD data to define the obstacles 810, one or more sensors, such as a sensor 840, may be used. The sensor(s) 840 may be a camera or any type of object sensor capable of providing 3D geometry of the obstacles 810 in the workspace 802. The sensor(s) 840 could be one or more 3D cameras, or a plurality of 2D cameras whose data is combined into 3D obstacle data. The sensor(s) 840 could also include other types of devices such as radar, LiDAR and/or ultrasonic. The sensor(s) 840 also communicate with the controller 820 and/or the computer 830 via any wireless or hardwire network connection.

In one embodiment, the controller 820 receives obstacle geometry data from either the computer 830 or the sensor(s) 840. The obstacle geometry data defines the 3D shapes of all of the obstacles 810 which exist in the workspace 802. The controller 820 converts the obstacle geometry data into a distance field map or matrix by voxelizing the obstacle geometry data, creating a binary 3D matrix of the workspace 802 where each cell contains a one if occupied and a zero if unoccupied, and calculating the distance field map from the binary matrix. The distance field matrix or map could alternately be computed by the computer 830 and provided to the controller 820. The controller 820 models the robot 800 as a set of points on the robot arms, where each point has a corresponding spherical safety zone bubble of a predefined radius. Using the bubble model of the robot 800 and the distance field map representing the obstacles 810, the controller 820 can calculate a minimum robot-to-obstacle distance extremely rapidly for any pose of the robot 800, using Equations (1) and (2). Using the calculated minimum robot-to-obstacle distance as a constraint function, the controller 820 performs motion optimization computations as necessary to control the operation of the robot 800.

In another embodiment, the computer 830 performs most of the computations—including creating the distance field matrix, modeling the motion optimization problem using the distance field constraint and other constraints, and solving the optimization problem. In this embodiment, the computer 830 provides a robot motion program, from the converged optimization solution, to the controller 820. The computing responsibilities may be divided up in any suitable fashion between the computer 830 and the controller 820.

In one example application, the robot 800 performs tasks involving continuously changing start and goal positions, and motion optimization computations are therefore required to be computed for each robot task. In another application, one or more of the obstacles 810 may be moving, in which case the distance field map must be recomputed before the motion optimization calculation. In either application, the rapid calculation of minimum robot-to-obstacle distance using the distance field map technique is extremely beneficial in supporting real time robot motion control.

Figure 9:
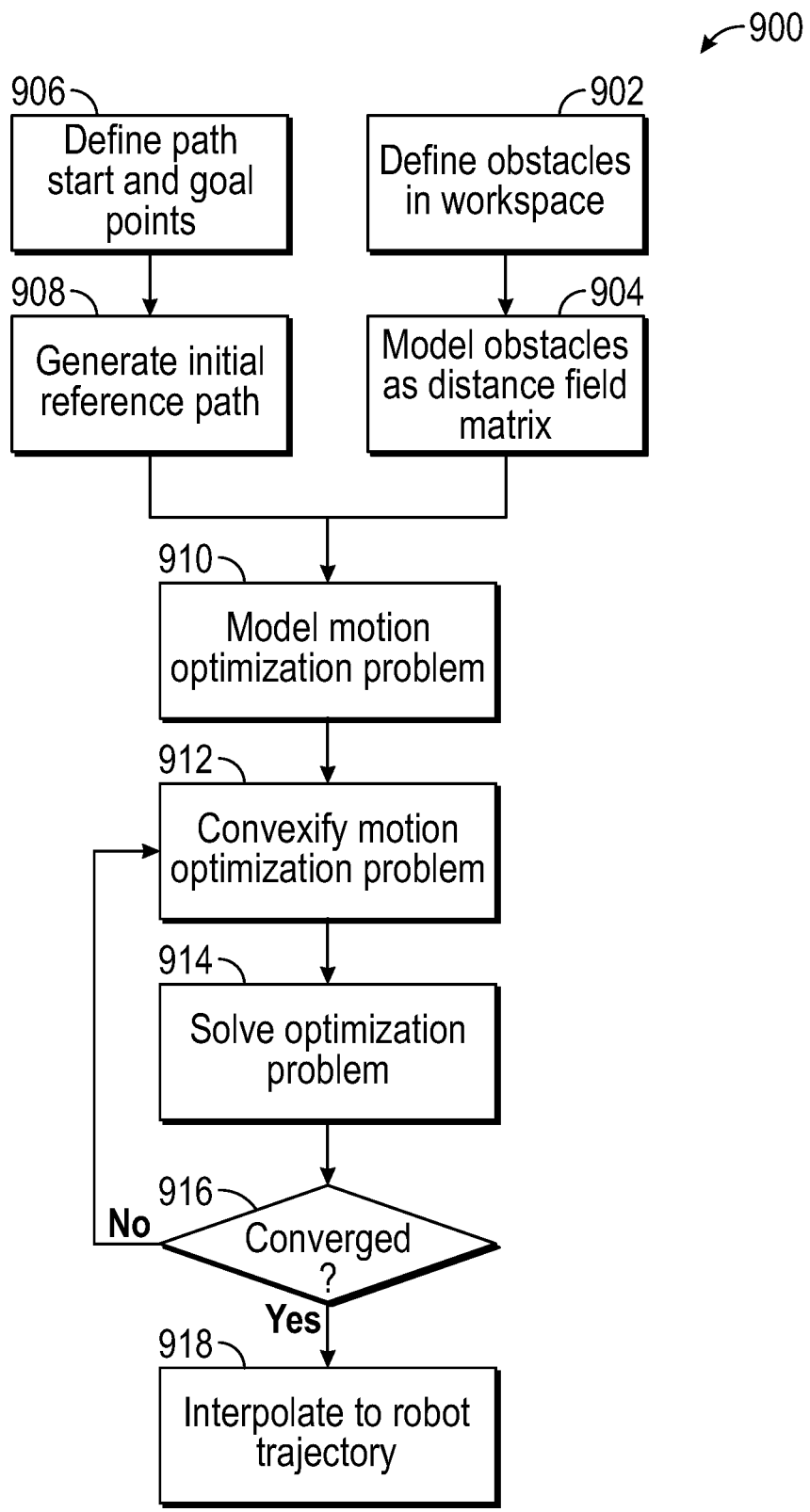
FIG. 9 is a flowchart diagram of a method for robot collision avoidance motion optimization using a distance field constraint function, according to an embodiment of the present disclosure.

FIG. 9 is a flowchart diagram 900 of a method for robot collision avoidance motion optimization using a distance field constraint function, according to an embodiment of the present disclosure. At box 902, the obstacles in the robot workspace are defined by CAD data or by sensor data, as described previously. At box 904, a distance field matrix representing the obstacles in the workspace is created. The distance field matrix is created by converting the obstacle data into a voxel model, creating a binary 3D matrix of the workspace environment where occupied cells or voxels contain a one and unoccupied cells or voxels contain a zero, and then calculating the distance field matrix where each cell contains a value which is the distance to the nearest occupied cell or voxel. Cells which are occupied and surrounded by other occupied cells have a negative value in the distance field matrix, representing a distance to the nearest unoccupied cell.

At box 906, start and goal points for a robot path are defined, based on a task that the robot is to perform. At box 908, an initial reference path is generated. The initial reference path could be a straight line from the start point to the goal point, or it could be an approximated path based on a previously-computed path having similar start and goal points. The initial reference path provides a starting point (an initial solution) for the motion optimization calculation. At box 910, the motion optimization problem is modeled in the robot controller. Modeling the motion optimization problem includes defining the objective function and the constraint functions as discussed earlier. In particular, this includes a collision avoidance inequality constraint where the minimum distance from the robot to any obstacle is modeled using the distance field matrix of the box 904, along with a set of points and spherical bubbles on the robot arms, and is computed using Equations (1) and (2).

Thus, the motion optimization problem can be defined as:

$$\min_{q=\{q_1,\ldots,q_T\}} f(q) \qquad (3)$$

Such that;

$$g(q) \leq 0 \qquad (4)$$

$$h(q) = 0 \qquad (5)$$

$$DF(q_t) \geq d_{safe} \forall t=1,\ldots,T \qquad (6)$$

Where f(q) is the optimization objective function (such as path length of the tool center point) to be minimized over the entire robot motion including poses q={$q_1, \ldots, q_T$}, g(q) are inequality constraints which must be satisfied (such as joint limits, joint velocities, accelerations and jerk, and tool center point velocity, acceleration and jerk remaining below limits), h(q) are equality constraints which must be satisfied (such as, the locations of the start and goal points, and system dynamics or kinematics equations), and $DF(q_t)$ is another inequality constraint (collision avoidance) where the minimum robot-to-obstacle distance which must be greater than the threshold value $d_{safe}$ for all of the robot poses $q_t$ as discussed in detail above.

The equality constraint related to system dynamics or kinematics is included in order to ensure that the computed motions can actually be physically performed by the robot. This constraint may be modeled by including a system dynamics equation of the form, $M\ddot{q}+C\dot{q}+Kq+G=\tau$—where q is joint angular position (and its customary first and second derivates), M is mass moment of inertia, C is a Coriolis coefficient, K is stiffness, G is load due to gravity and $\tau$ is joint torque. An equation of this type would be evaluated for each of the robot's joints.

Alternately, the equality constraint may be modeled as kinematics equations of the double integrator form, $\dot{x}=Ax+Bu$
Where:

$$x = \begin{bmatrix} q \\ \dot{q} \end{bmatrix}, A = \begin{bmatrix} 0 & 0 \\ 0 & 1 \end{bmatrix}, B = \begin{bmatrix} 0 \\ 1 \end{bmatrix}, \text{ and } u = \ddot{q}.$$

Again, each joint in the robot would be modeled with the kinematics equations.

At box 912, the motion optimization problem is convexified in preparation for solving. Convexifying the optimization problem includes approximating one or more of the constraints as polynomial-time functions, with the resulting computation being more readily solvable and yielding only one optimal solution. In one embodiment, the collision avoidance inequality constraint is linearized to improve the convergence behavior of the optimization problem. In this embodiment, Equation (6) is approximated as a first-order Taylor expansion as follows:

$$DF(q_t^r)+\nabla DF(q_t^r)(q_t-g_t^r) \geq d_{safe} \quad (7)$$

Where $g_t^r$ is the reference position at time step t (the reference position is the initial reference given from input, or the previous optimization iteration), $q_t$ is the planning position at time step t that is being solved for in the optimization, and $\nabla DF$ is the gradient of the distance function DF at the position $g_t^r$. The gradient term of the linearized constraint serves to "push away" the point on the robot arm from the obstacle in the distance field map.

At box 914, the convexified optimization problem is solved, with a check at decision diamond 916 to determine whether the solution has converged to within a predefined tolerance. Techniques for solving the convexified optimization problem are known in the art, and with the collision avoidance distance field constraint linearized, the solution converges quickly. At box 918, the converged optimization solution is interpolated to define a complete robot trajectory including all joint motions and the tool motion which satisfies the constraint functions—including the collision avoidance constraint.

Given the obstacle data definition from CAD or sensors, all of the steps of the method of the flowchart diagram 900 may be performed in a robot controller such as the controller 820 and/or the computer 830. That is, in one embodiment, the controller 820 computes the distance field matrix representing the obstacles, and computes the robot-to-obstacle distance for any robot pose using the distance field matrix and the multi-point model of the robot as discussed. In this embodiment, the robot controller 820 also models the optimization problem based on the start and goal points and initial reference path, the distance field matrix model and other constraints, and the controller 820 then solves the optimization problem and controls the motion of the robot 800 in real time.

In another embodiment, the robot controller 820 only controls the motion of the robot 800, using a motion program which is computed by the computer 830. In this embodiment, the computer 830 computes the distance field matrix representing the obstacles, computes the robot-to-obstacle distance for any robot pose using the distance field matrix and the multi-point model of the robot, models the optimization problem based on the start and goal points and initial reference path, the distance field matrix model and other constraints, and then solves the optimization problem. The computing responsibilities may also be divided up in other ways, as would be understood by those skilled in the art. For example, the computer 830 could provide the distance field matrix, and the controller 820 could perform the rest of the optimization problem modeling and solution. In some embodiments, the computer 830 is not needed.

Throughout the preceding discussion, various computers and controllers are described and implied. It is to be understood that the software applications and modules of these computer and controllers are executed on one or more computing devices having a processor and a memory module. In particular, this includes a processor in each of the robot controller 820 and the computer 830 discussed above. Specifically, the processor in the controller 820 and/or the computer 830 is configured to use the distance field matrix as a constraint function in a collision avoidance optimization path planning computation in the manner described throughout the foregoing disclosure.

As outlined above, the disclosed techniques for a robot collision avoidance motion optimization technique using a distance field constraint function improve the speed and reliability of robot path planning for collision avoidance. The disclosed techniques avoid the up-front effort of modeling obstacles as geometry primitives, allow complex shapes to be easily and automatically represented as voxels and used to compute the distance field matrix, and enable rapid calculation of robot-to-obstacle distance even when many obstacles are present.

While a number of exemplary aspects and embodiments of the robot collision avoidance motion optimization technique using a distance field constraint function have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for planning a path of an industrial robot, said method comprising:
providing obstacle data defining obstacles in a workspace of the robot;
computing a distance field matrix from the obstacle data, said distance field matrix being a three-dimensional (3D) matrix representing the workspace, where each cell in the distance field matrix contains a value designating a distance to a nearest cell occupied by any part of any of the obstacles;

modeling a robot motion optimization problem, using a computer having a processor and memory, including defining an objective function, defining start and goal points of the path as equality constraints, and defining a collision avoidance inequality constraint using the distance field matrix, where defining the collision avoidance inequality constraint includes defining a plurality of points on arms of the robot, and determining, for each computed pose of the robot, a distance-to-obstacle for each of the points as the value in the cell containing the point minus a predefined radius for the point; and solving the motion optimization problem, by the computer, to yield the path of the robot.

2. The method according to claim 1 wherein providing obstacle data includes providing the obstacle data from a computer aided design (CAD) system.

3. The method according to claim 1 wherein providing obstacle data includes providing the obstacle data from one or more sensors configured to detect the obstacles in the workspace.

4. The method according to claim 1 wherein computing the distance field matrix from the obstacle data includes converting the obstacle data to voxels, creating a binary 3D matrix of occupancy data, and computing the distance field matrix from the binary 3D matrix of occupancy data.

5. The method according to claim 1 wherein, for each computed pose of the robot, a robot-to-obstacle distance is determined as a minimum distance-to-obstacle for any of the points, and the collision avoidance inequality constraint is that the robot-to-obstacle distance must exceed a predefined threshold.

6. The method according to claim 1 wherein modeling the robot motion optimization problem also includes generating an initial reference path based on the start and goal points.

7. The method according to claim 1 wherein modeling the robot motion optimization problem also includes defining motion limit inequality constraints, including robot joint rotational velocity, acceleration and jerk not exceeding predefined thresholds, robot tool center point velocity, acceleration and jerk not exceeding predefined thresholds, and joint positions not exceeding predefined limits, and further includes defining equality constraints based on system dynamics or kinematics equations for each joint of the robot.

8. The method according to claim 1 further comprising convexifying the robot motion optimization problem before solving the robot motion optimization problem, including approximating the collision avoidance inequality constraint as a first-order Taylor series expansion.

9. The method according to claim 8 wherein solving the motion optimization problem includes iteratively solving the motion optimization problem until a solution converges to a predefined convergence criteria.

10. The method according to claim 1 wherein solving the motion optimization problem yields a solution vector containing the start and goal points and a number of intermediate points, and a continuous robot trajectory is interpolated from the solution vector.

11. A method for planning a path of an industrial robot, said method comprising modeling and solving a robot motion optimization problem, using a computer, where modeling the optimization problem includes defining an objective function, defining start and goal points of the path as equality constraints, and defining a collision avoidance inequality constraint using a distance field matrix, said distance field matrix being a three-dimensional matrix representing a workspace of the robot, where each cell in the distance field matrix contains a value designating a distance to a nearest cell occupied by any part of any obstacle in the workspace, where defining the collision avoidance inequality constraint includes defining a plurality of points on arms of the robot, and determining, for each computed pose of the robot, a distance-to-obstacle for each of the points as the value in the cell containing the point minus a predefined radius for the point.

12. A path planning system for an industrial robot, said system comprising:

means for providing obstacle data defining obstacles in a workspace of the robot; and a computer in communication with the robot and the means for providing obstacle data, said computer having a processor and memory configured for;

computing a distance field matrix from the obstacle data, said distance field matrix being a three-dimensional (3D) matrix representing the workspace, where each cell in the distance field matrix contains a value designating a distance to a nearest cell occupied by any part of any of the obstacles;

modeling a robot motion optimization problem, including defining an objective function, defining start and goal points of the path as equality constraints, and defining a collision avoidance inequality constraint using the distance field matrix, where defining the collision avoidance inequality constraint includes defining a plurality of points on arms of the robot, and determining, for each computed pose of the robot, a distance-to-obstacle for each of the points as the value in the cell containing the point minus a predefined radius for the point; and solving the motion optimization problem to yield the path of the robot.

13. The system according to claim 12 wherein providing obstacle data includes providing the obstacle data from a computer aided design (CAD) system or providing the obstacle data from one or more sensors configured to detect the obstacles in the workspace, where the one or more sensors includes one or more camera, radar sensor, LiDAR sensor, ultrasonic sensor or infrared sensor.

14. The system according to claim 12 wherein computing the distance field matrix from the obstacle data includes converting the obstacle data to voxels, creating a binary 3D matrix of occupancy data, and computing the distance field matrix from the binary 3D matrix of occupancy data.

15. The system according to claim 12 wherein, for each computed pose of the robot, a robot-to-obstacle distance is determined as a minimum distance-to-obstacle for any of the points, and the collision avoidance inequality constraint is that the robot-to-obstacle distance must exceed a predefined threshold.

16. The system according to claim 12 wherein modeling the robot motion optimization problem also includes generating an initial reference path based on the start and goal points.

17. The system according to claim 12 wherein modeling the robot motion optimization problem also includes defining motion limit inequality constraints, including robot joint rotational velocity, acceleration and jerk not exceeding predefined thresholds, robot tool center point velocity, acceleration and jerk not exceeding predefined thresholds, and joint positions not exceeding predefined limits, and further includes defining equality constraints based on system dynamics or kinematics equations for each joint of the robot.

18. The system according to claim 12 wherein the computer is further configured for convexifying the robot motion optimization problem, including approximating the collision avoidance inequality constraint as a first-order Taylor series expansion, and where solving the robot motion optimization problem includes iteratively solving the motion optimization problem until a solution converges to a predefined convergence criteria.

19. A method for planning a path of an industrial robot, said method comprising:
providing obstacle data defining obstacles in a workspace of the robot;
computing a distance field matrix from the obstacle data, said distance field matrix being a three-dimensional (3D) matrix representing the workspace, where each cell in the distance field matrix contains a value designating a distance to a nearest cell occupied by any part of any of the obstacles;
modeling a robot motion optimization problem, using a computer having a processor and memory, including defining an objective function, defining start and goal points of the path as equality constraints, and defining a collision avoidance inequality constraint using the distance field matrix, where modeling the robot motion optimization problem also includes defining motion limit inequality constraints, including robot joint rotational velocity, acceleration and jerk not exceeding predefined thresholds, robot tool center point velocity, acceleration and jerk not exceeding predefined thresholds, and joint positions not exceeding predefined limits, and further includes defining equality constraints based on system dynamics or kinematics equations for each joint of the robot; and
solving the motion optimization problem, by the computer, to yield the path of the robot.

20. A path planning system for an industrial robot, said system comprising:
means for providing obstacle data defining obstacles in a workspace of the robot; and
a computer in communication with the robot and the means for providing obstacle data, said computer having a processor and memory configured for;
computing a distance field matrix from the obstacle data, said distance field matrix being a three-dimensional (3D) matrix representing the workspace, where each cell in the distance field matrix contains a value designating a distance to a nearest cell occupied by any part of any of the obstacles;
modeling a robot motion optimization problem, including defining an objective function, defining start and goal points of the path as equality constraints, and defining a collision avoidance inequality constraint using the distance field matrix, where modeling the robot motion optimization problem also includes defining motion limit inequality constraints, including robot joint rotational velocity, acceleration and jerk not exceeding predefined thresholds, robot tool center point velocity, acceleration and jerk not exceeding predefined thresholds, and joint positions not exceeding predefined limits, and further includes defining equality constraints based on system dynamics or kinematics equations for each joint of the robot; and
solving the motion optimization problem to yield the path of the robot.

21. A method for planning a path of an industrial robot, said method comprising modeling and solving a robot motion optimization problem, using a computer, where modeling the optimization problem includes defining an objective function, defining start and goal points of the path as equality constraints, and defining a collision avoidance inequality constraint using a distance field matrix, said distance field matrix being a three-dimensional matrix representing a workspace of the robot, where each cell in the distance field matrix contains a value designating a distance to a nearest cell occupied by any part of any obstacle in the workspace, where modeling the robot motion optimization problem also includes defining motion limit inequality constraints, including robot joint rotational velocity, acceleration and jerk not exceeding predefined thresholds, robot tool center point velocity, acceleration and jerk not exceeding predefined thresholds, and joint positions not exceeding predefined limits, and further includes defining equality constraints based on system dynamics or kinematics equations for each joint of the robot.

* * * * *